United States Patent
Wainwright

(10) Patent No.: US 8,217,922 B2
(45) Date of Patent: Jul. 10, 2012

(54) SYNCHRONIZED VISUAL AND AUDIO APPARATUS AND METHOD

(76) Inventor: Harry Lee Wainwright, Bethleham, PA (US)

( * ) Notice: Subject to any disclaimer, the term of this patent is extended or adjusted under 35 U.S.C. 154(b) by 1131 days.

(21) Appl. No.: 11/970,362

(22) Filed: Jan. 7, 2008

(65) Prior Publication Data

US 2009/0174716 A1      Jul. 9, 2009

(51) Int. Cl.
*G06F 3/038*       (2006.01)
*G09G 5/00*        (2006.01)
(52) U.S. Cl. .............................. 345/204; 345/473; 352/85
(58) Field of Classification Search .................. 345/158, 345/204, 473–475, 173; 352/85, 87, 101
See application file for complete search history.

(56) References Cited

U.S. PATENT DOCUMENTS

| | | | |
|---|---|---|---|
| 4,185,276 A | 1/1980 | Benson | |
| 4,709,307 A | 11/1987 | Branom | |
| 4,875,144 A | 10/1989 | Wainwright | |
| 5,046,394 A | 9/1991 | Suzuki et al. | |
| 5,128,843 A | 7/1992 | Guritz | |
| 5,461,188 A | 10/1995 | Drago et al. | |
| 6,651,365 B1 | 11/2003 | Wainwright | |
| 6,919,892 B1* | 7/2005 | Cheiky et al. | 345/473 |
| 7,027,054 B1* | 4/2006 | Cheiky et al. | 345/473 |
| 7,073,932 B2 | 7/2006 | Wainwright | |
| 7,125,142 B2 | 10/2006 | Wainwright | |
| 7,427,986 B2* | 9/2008 | Pellacini et al. | 345/426 |
| 2006/0207134 A1* | 9/2006 | Harry | 40/453 |
| 2007/0211036 A1* | 9/2007 | Perkins | 345/173 |
| 2009/0066700 A1* | 3/2009 | Harding et al. | 345/473 |
| 2009/0153567 A1* | 6/2009 | Jung | 345/473 |
| 2010/0007665 A1* | 1/2010 | Smith et al. | 345/473 |

* cited by examiner

*Primary Examiner* — Kimnhung Nguyen
(74) *Attorney, Agent, or Firm* — Lewis, Rice & Fingersh, L.C.

(57) ABSTRACT

A method and apparatus for synchronizing sound with an illuminated animated image is provided. First and second image frames are defined on a planar surface using a plurality of light transmitting media. A plurality of light sources are positioned adjacent to the plurality of light transmitting media such that the first image frame and the second image frame are illuminated independently by selectively activating each light source in accordance with a pre-programmed illumination sequence. A speaker plays a first sound when the first image frame is illuminated and a second sound when the second image frame is illuminated. A driving device, coupled to the light sources and the speaker, is used to synchronize the illumination of the image frames with the sounds.

23 Claims, 6 Drawing Sheets

SYNCHRONIZED VISUAL AND AUDIO APPARATUS AND METHOD

FIELD

The embodiments described herein relate to illuminated animated images, particularly illuminated animated images with accompanying synchronized sounds.

BACKGROUND

Animated images with accompanying sound are a common form of entertainment and can be found providing amusement for children and adults. Animated images are also commonly used in advertising. Often, an animated image is displayed using a screen such as a Liquid Crystal Display (LCD) with an associated speaker to provide accompanying sounds. The sounds associated with the animated image can be as much a part of the experience of viewing an animated image as the image itself and often provide much of the entertainment or information.

At times, such screens are impractical or undesirable and animated images can be displayed on other, non-traditional, surfaces such as fabric, metal or plastic and various personal or household items such as clothing, pillows or tabletops. However, it is generally the case that animated images displayed on these or other non-traditional surfaces are displayed without any accompanying sounds, thus depriving viewers of a significant portion of the entertainment or information that could otherwise have been derived from the experience.

There exist methods of displaying animated images on other surfaces such as those disclosed in U.S. Pat. Nos. 6,461,365, 4,875,144 and 4,709,307. However, these documents do not disclose any technique for synchronizing sound with the animated images.

There exist methods of coordinating sounds with light displays, such as those disclosed in U.S. Pat. Nos. 4,185,276, 5,461,188, 5,128,843. However, these documents do not disclose means for synchronizing sounds with animated images.

SUMMARY

The embodiments described herein provide in one aspect, a method of synchronizing sound with an illuminated animated image, said method comprising:
(a) defining a first image frame and a second image frame on a planar surface using a plurality of light transmitting media;
(b) positioning a plurality of light sources adjacent the plurality of light transmitting media;
(c) independently illuminating the first image frame and the second image frame by selectively activating each light source of the plurality of light sources in accordance with a pre-programmed illumination sequence; and
(d) outputting a first sound when the first image frame is illuminated and outputting a second sound when the second image frame is illuminated.

The embodiments described herein provide in another aspect, an apparatus for synchronizing sound with an illuminated animated image, said apparatus comprising:
(a) a planar surface;
(b) a plurality of light transmitting media coupled to the planar surface for defining a first image frame and a second image frame on the planar surface;
(c) a plurality of light sources positioned adjacent to the plurality of light transmitting media; and
(d) a driving device coupled to the light sources configured to:
(I) independently illuminate the first image frame and the second image frame by selectively activating each light source of the plurality of light sources in accordance with a pre-programmed illumination sequence; and
(II) output a first sound when the first image frame is illuminated and output a second sound when the second image frame is illuminated using a speaker mechanism coupled to the driving device.

The embodiments described herein provide in another aspect, an interactive system of apparatuses for synchronizing sound with an illuminated animated image comprising a first apparatus and a second apparatus wherein a communication module of the first apparatus is further configured for sending and receiving data to and from a communication module of the second apparatus, and the communication module of the second apparatus is further configured for sending and receiving data to and from the communication module of the first apparatus.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
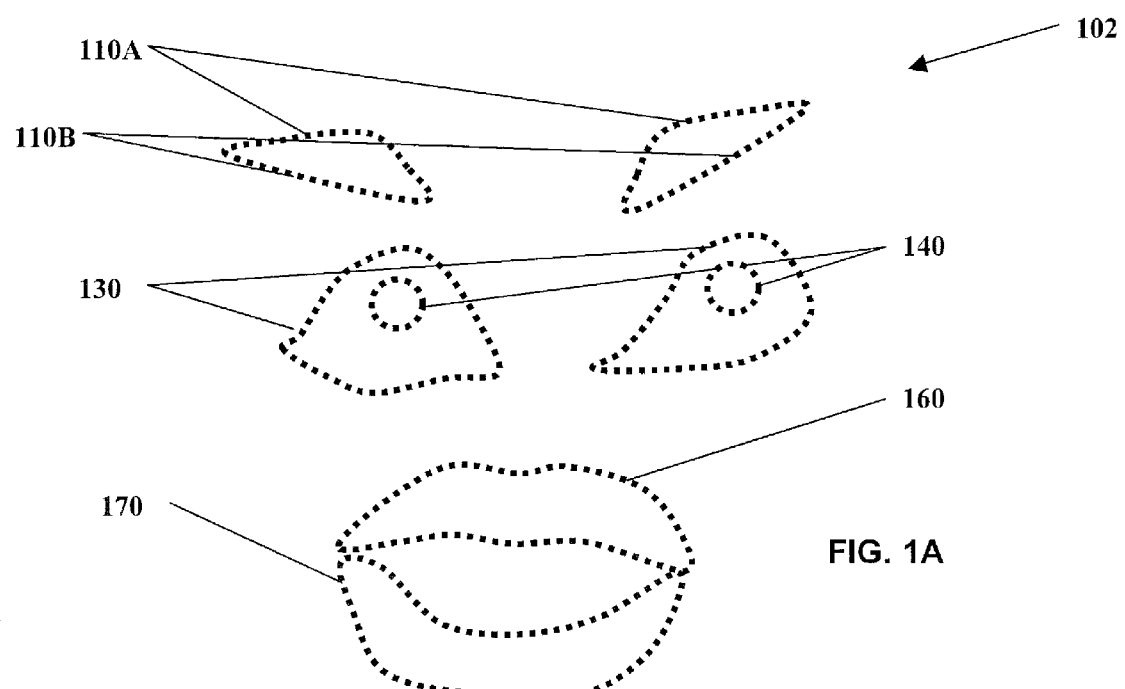
FIG. 1A is a schematic representation of a first frame of an illuminated animated image with synchronized sound.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1B:
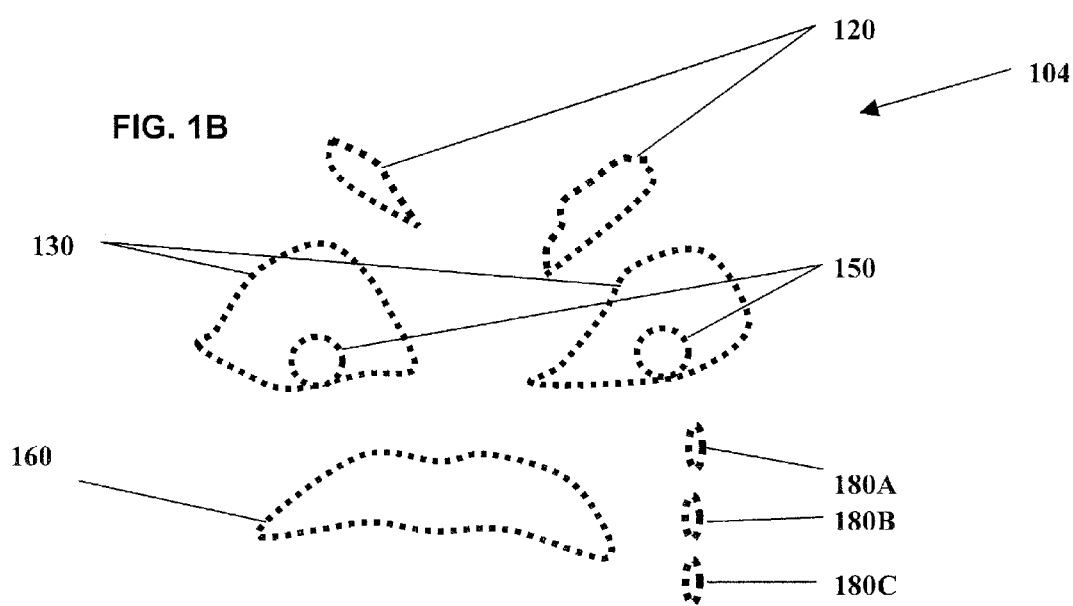
FIG. 1B is a schematic representation of a second frame of an illuminated animated image with synchronized sound.
Figure 1C:
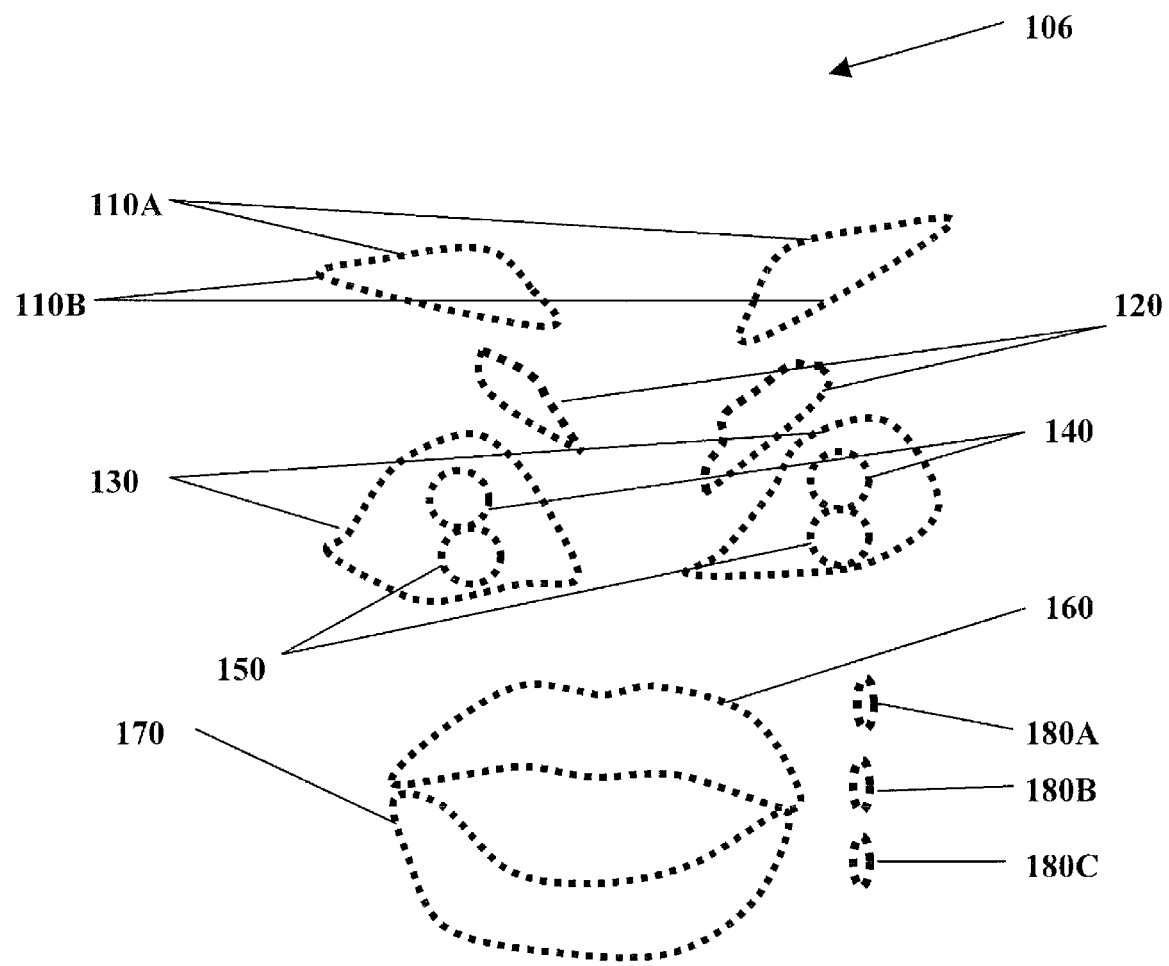
FIG. 1C is a schematic representation of a first frame and second frame of an illuminated animated image with synchronized sound in an overlapping relationship.

FIGS. 1A, 1B and 1C illustrate a method of synchronizing sound with an illuminated animated image. The embodiment shown is an illuminated animated image of a face.

Specifically, FIG. 1A shows a first frame 102 and FIG. 1B shows a second frame 104 while FIG. 1C shows both the first and second frames in an overlapping relationship 106. FIGS. 1A to 1C also show individual image elements, which in this embodiment correspond to facial features, such as eyebrows 110A, 110B, 120, eyeballs 130, centered pupils 140, downcast pupils 150, upper lip 160, lower lip 170, and tears 180A, 180B, 180C, The first frame, FIG. 1A, of the illuminated animated image shows a laughing face and comprises upraised eyebrows 110A, 110B, eyeballs 130, centered pupils 140, upper lip 160 and lower lip 170 while the second frame, FIG. 1B, shows a sad face and comprises slanted eyebrows 120, eyeballs 130, downcast pupils 150, upper lip 160 and tears 180A, 180B, 180C.

It will be noted that some of the image elements are used in both image frames, eyeballs 130 and upper lip 160, while the remainder are used in a single image frame. When illuminating only the image elements in the first frame 102 the image is of a laughing face while illuminating only the image elements in the second frame 104 displays the image of a sad face. By selectively illuminating either the first frame 102 or the second frame 104 the expression displayed by the illuminated animated image can be made to display either a laughing face or a sad face. The image frames presented are intended as examples only as variations will occur to one skilled in the art.

Figure 2:
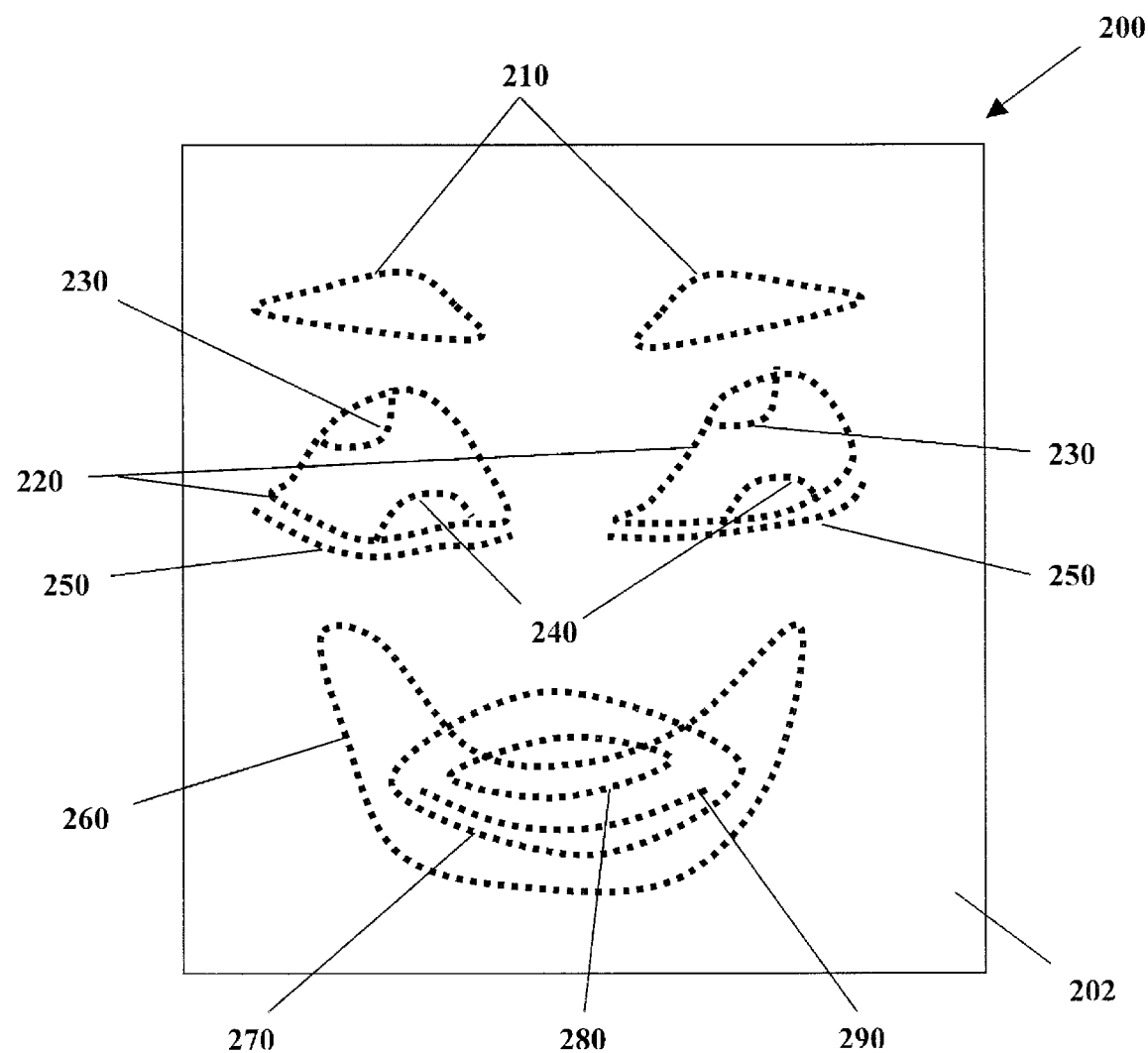
FIG. 2 is a schematic representation of an embodiment of a method of synchronizing sound with an illuminated animated image.

The animated illuminated image in FIG. 1C and the illuminated animated image frames in FIGS. 1A and 1B are defined by a plurality of light transmitting media (e.g. 440 or 442 in FIG. 4), for example a plurality of optical fibers 100 (FIG. 4) corresponding to illuminated points arranged on a planar surface 202 (FIG. 2). The planar surface 202 may comprise metal, plastic or fabric. The planar surface 202 may be part of a common personal or household item such as clothing, a pillow or a tabletop. The planar surface 202 will be discussed in more detail below.

Light sources (e.g. 410 and 420 in FIG. 4), for example LEDs, are placed adjacent to the light transmitting media in order to provide illumination to the image frames. The light transmitting media (e.g. 440 or 442 in FIG. 4) may be grouped according to image frame, image element or in any other suitable manner, for example optical fibers 100 (FIG. 4) from one image frame may be bundled together so that a single light source 410 and 420 (FIG. 4) may illuminate an entire image frame.

Figure 4:
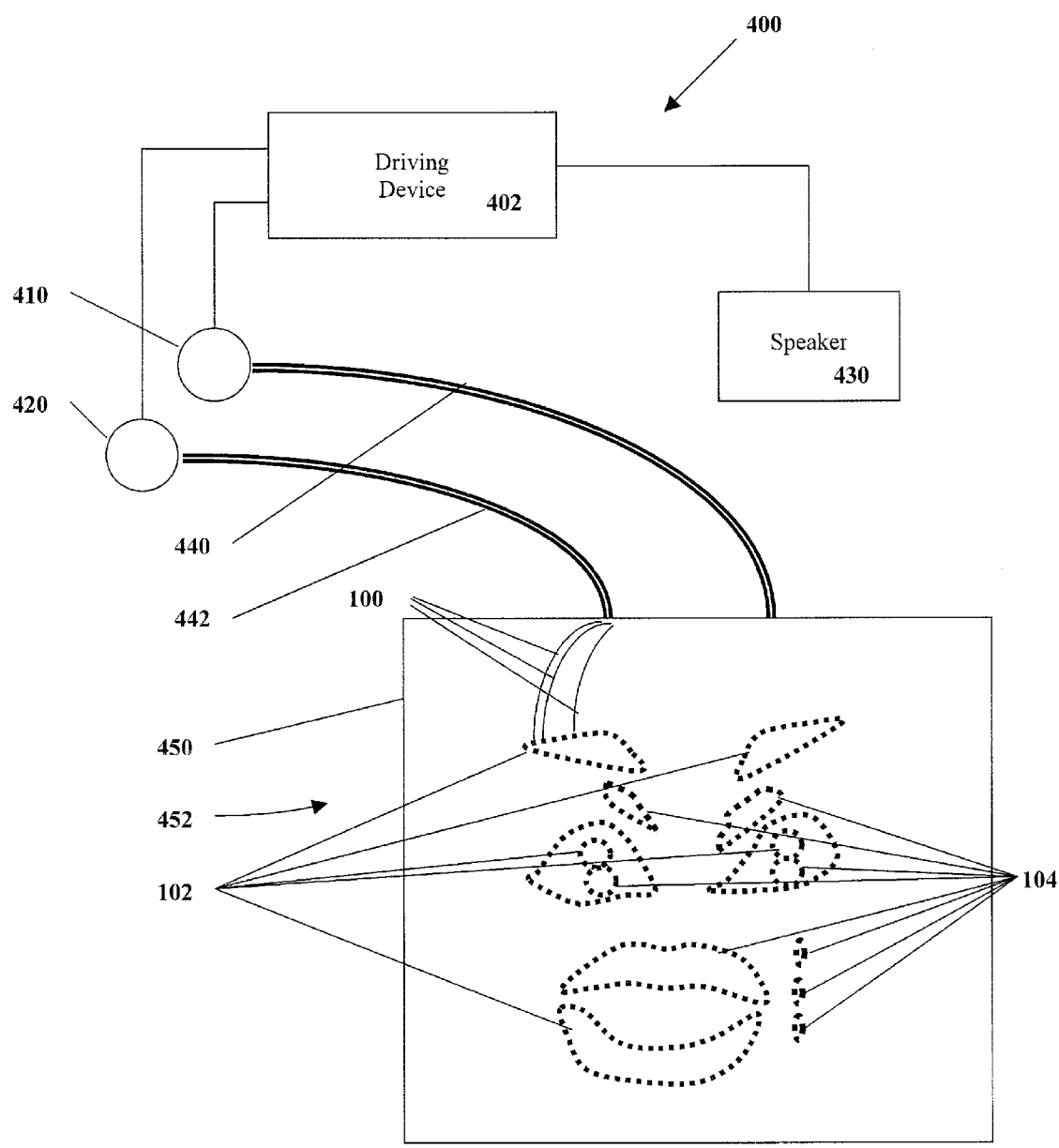
FIG. 4 is a block diagram of an embodiment of an apparatus for synchronizing sound with an illuminated animated image.

Alternatively, as in the embodiment shown in FIGS. 1A to 1C there may be a separate bundle of optical fibers acting as the light transmitting media for each image element in the described embodiment, the upper upraised eyebrows 110A, the lower upraised eyebrows 110B, the slanted eyebrows 120, the eyeballs 130, the centered pupils 140, the downcast pupils 150, the upper lip 160, the lower lip 170, the upper tear 180A, the middle tear, 180B and the lower tear 180C. In the case of multiple bundles of optical fibers, each bundle may have a corresponding light source 410 and 420 (FIG. 4). Through selective activation of the light sources and synchronized playback of sounds appropriate to the images being displayed, a cartoon with auditory and visual imagery can be played out on the planar surface (not shown).

In the embodiment shown in FIGS. 1A to 1C an image is displayed while simultaneously providing a sound that is appropriate for the image. A first sound is provided while the first image frame is illuminated while a second sound is provided while the second image frame is illuminated. For example, when the first frame 102, a laughing face, is displayed, the sound of laughter may be provided while the sound of crying may be provided when the sad face of the second frame 104 is displayed.

Implementing the embodiment described above may be accomplished through use of a driving device (not shown). A driving device is a device for coordinating the selective illumination and extinguishment of illuminated animated image frames or image elements with synchronized sounds appropriate to the images such that the sounds are heard at substantially the same time as the images are seen. A driving device may comprise a memory where programmed illumination sequences and synchronized sounds are stored. An example of a driving device suitable for driving an illuminated animated image with two frames and synchronized sound is provided below.

It will be appreciated that the illuminated animated image may also comprise sub-frames. In the case of the first frame 102, the image of the laughing face may comprise two sub-frames, as shown in FIG. 1A. The overall image frame showing a laughing face remains illuminated, while alternately illuminating and extinguishing the two sets of upraised eyebrows 110A, 110B. Specifically, the first sub-frame illuminates the upper upraised eyebrows, eyeballs 130, centered pupils 140, upper lip 160 and lower lip 170 while the second sub-frame illuminates the lower upraised eyebrows 110B, eyeballs 130, centered pupils 140, upper lip 160 and lower lip 170.

In the case of the second frame 104, the image of the sad face, multiple sub-frames are possible, as shown in FIG. 1B. For example, the slanted eyebrows 120, eyeballs 130, downcast pupils 150 and upper lip 160 could remain illuminated while the tears 180 are illuminated and extinguished in an alternating, repeating sequence such as upper tear 180A, middle tear 180B lower tear 180C. The sub-frames presented are intended as examples only as variations will occur to one skilled in the art. It will further be appreciated that the accompanying sounds may be chosen to reflect the image sub-frames as well as the entire image frames. For example, changes in pitch of the sound of laughter might correspond to alternating illumination of the upper upraised eyebrows 110A and the lower upraised eyebrows 110B.

FIG. 2 shows a representation of a second embodiment of a method of synchronizing sound with an illuminated animated image. This second embodiment is a second illuminated animated image of a face 200 on a planar surface 202. Specifically, FIG. 2 shows several overlapping image elements that may be combined into several different frames or sub-frames. FIG. 2 shows image elements eyebrows 210, eyes in various positions 220, 230, 240, 250 and a mouth in various positions 260, 270, 280, 290. By synchronizing the sound of a voice with the illuminating and extinguishing of the mouth image elements 260, 270, 280, 290, the illuminated animated image can appear to be speaking. In addition, illumination of the eye image elements can be synchronized with the illumination of the mouth image elements and the sound of the voice to produce animated facial expressions appropriate to the voice. For example, when the voice is saying something funny, such as telling a joke, the eyes can express happiness or laughter while the eyes can express sadness when the voice is saying something sad, such as telling a sad story.

Figure 3:
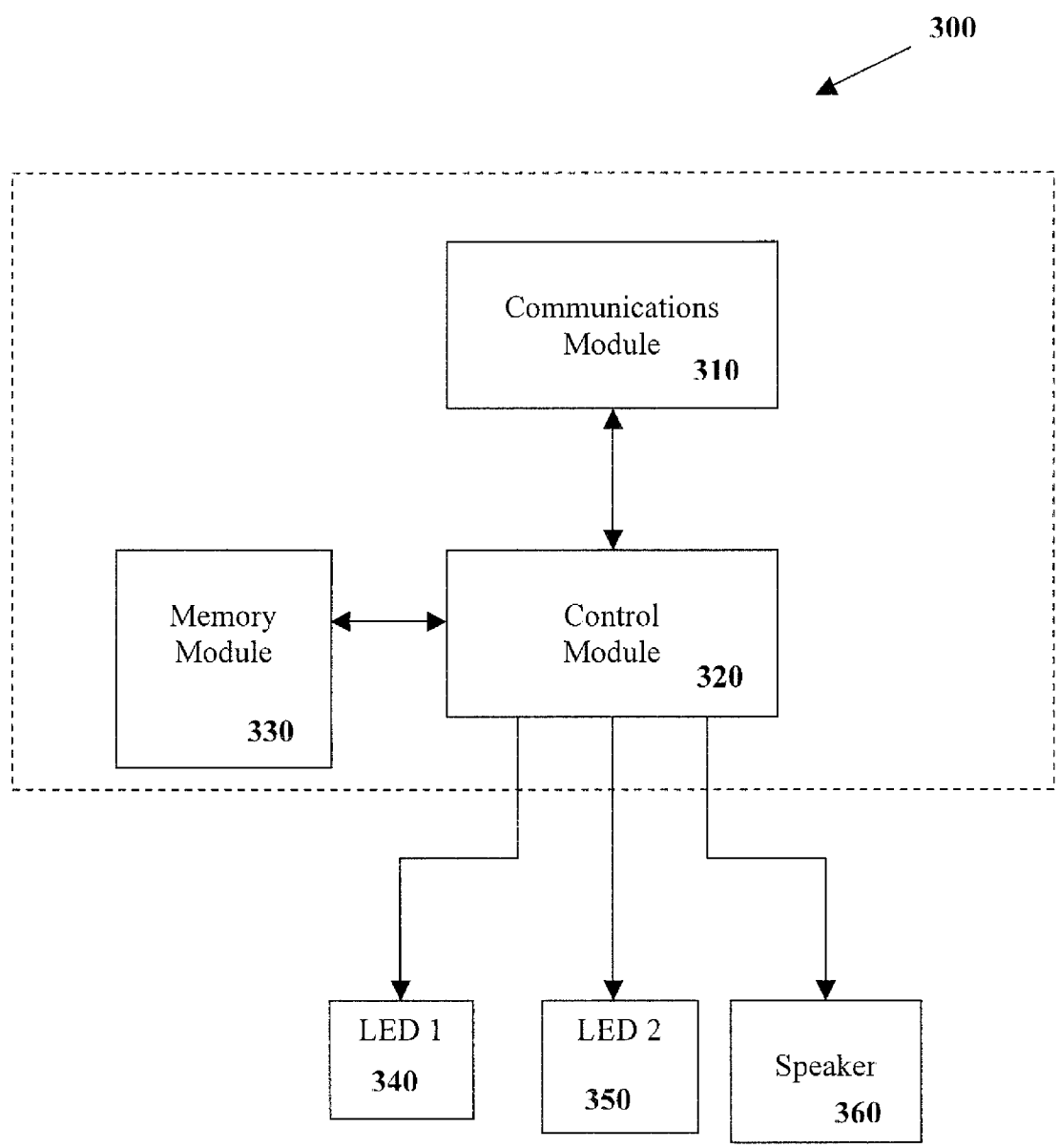
FIG. 3 is a block diagram of an embodiment of a driving device for driving the illumination of two image frames and synchronizing accompanying sounds.

FIG. 3 shows a schematic representation of an embodiment of a driving device 300 for driving the illumination of two image frames and synchronizing the accompanying sounds. The driving device 300 comprises a memory module 330, a control module 320 and optionally, a communication module 310. The memory module 330 is linked to the control module 320. The communication module 310, if present, is also linked to the control module 320.

The driving device of FIG. 3 is configured to drive an illuminated animated image with two image frames and sound accompaniment for each frame, where the first frame, for example a laughing face, is illuminated using a first LED 340, the second frame, for example a sad face, is illuminated using a second LED 350 and the sound accompaniment, for example the sound of laughter for the first image frame and the sound of crying for the second image frame, is provided through the speaker 360, according to a programmed sequence stored in the memory module 330. The first LED 340 and second LED 350 are adjacent to the light transmitting media (not shown) that define the respective first and second frames of the illuminated animated image.

The control module 320 controls the operation of the illuminated animated image with synchronized sound accompaniment. The control module 320 retrieves a programmed illumination sequence from the memory module 330 along with a programmed sequence of synchronized sounds. The control module 320 then instructs the first LED 340, the second LED 350 and the speaker 360 to illuminate image frames and play synchronized sounds according to the programmed sequence. For example, the programmed sequence might comprise illuminating the first LED 340 and a corresponding first image frame of a laughing face while playing the sound of laughter through the speaker 360, extinguishing the first LED 340 while halting the playback of the sound of laughter, illuminating the second LED 350 and a corresponding second image frame of a sad face while playing the sound of crying through the speaker 360, extinguishing the second LED 350 while halting the playback of the sound of crying.

A control module 320 and a memory module 330 may be contained on a single printed circuit board. For example, the Winbond demo board, part number: WHS-588C/D-H2, emulates Winbond's W588C and W588D series of speech chips and demonstrates what the programmed code will sound like when fabricated into the final product. A speaker, such as Voice Express: Speaker Part #254-PS603-RO (8 ohms Freq. Range 400 Hz-6.5 KHz), will work with a 6 KHz audio wave file and may be connected directly to the printed circuit board.

In alternative embodiments the driving device may be configured to drive other, more complex combinations of image frames or image elements and synchronized sounds. For example, the use of a greater number of LEDs allows individual image elements to be switched on and off, perhaps to animate image sub-frames, rather than the entire image frame, perhaps to provide a larger number of image frames or perhaps to provide more elaborate image frames or sub-frames. For example, alternating illumination of the upper and lower upraised eyebrows 110A, 110B from FIG. 1A might comprise a sub-frame animation. A greater number of LEDs also allows the use of a greater variety of colours, for example, a red LED for an illuminated animated image of lips and a blue LED for an illuminated animated image of eyes.

A greater variety of synchronized sounds are also possible, as is a greater variety of interplay between the illuminated animated images and the synchronized sounds, even within a single image frame. For example, the image frame of the laughing face could be illuminated with a single set of upraised eyebrows while the sound of a voice telling a joke plays whereupon, when the joke is finished, the sound of laughter plays during the sub-frame animation of the alternating upper and lower upraised eyebrows. Multiple LEDs corresponding to multiple image elements, for example the image elements of FIG. 2, along with synchronized sounds of a voice speaking could be combined to make the illuminated animated image appear to be speaking.

The printed circuit board mentioned above, for example, is capable of controlling the synchronized illumination of 30 separate image frames with 2 minutes of sound accompaniment.

In another embodiment, when the driving device comprises a communications module 310, the communications module 310 may comprise a simple on/off switch to indicate whether the viewer wishes to activate the illuminated animated image and accompanying sounds. In another embodiment, the communications module 310 may comprise a sensor for detecting the presence of a viewer, for example a proximity sensor. Photo-light sensors, vibration and impact motion detection switches, magnetic reed switches, physical contact switches, momentary contact switches, RF Remote switches, audio detection switches, and Infrared (IR) Detection Switches are all possible types of sensors known in the art.

In a further embodiment, the memory module 330 is programmable and the communications module 310 comprises an interface for obtaining additional or substitute program sequences/sounds and for communicating information to other devices or a communications network. By way of example, the interface may comprise a wired network interface such a Universal Serial Bus (USB) or Ethernet, a wireless network interface, a digital media reader.

In one embodiment, the communications module 310 is capable of sending and/or receiving instructions through its interface regarding which sequences of illuminated animated images and accompanying synchronized sounds to execute. In a further embodiment, the communications module 310 is capable of sending and/or receiving new sequences of illuminated animated images and accompanying synchronized sounds.

In another embodiment the communications module 310 is in communication with a computer, for example through a USB connection. In this embodiment the computer could send sequence/sound information to the device through the communications module 310 to be stored in the memory module 330. This connection would allow a user to load a routine into the device's memory module 330 that the user may have obtained from the Internet or created on the computer.

FIG. 4 shows a schematic representation of one embodiment of an apparatus 400 for synchronizing sound with an illuminated animated image. In this embodiment the apparatus 400 comprises a first image frame 102 and a second image frame 104 that are defined on a planar surface 450 using a first light transmitting medium 440 and a second light transmitting medium 442, a first light source (LED) 410 and a second light source (LED) 420, a speaker 430 and a driving device 402.

The first and second light transmitting media 440, 442 includes optical fibers secured to the backside 452 of the planar surface 450, by any means known in the art, but passing through the planar surface 450 so that each of the plurality of optical fibers 100 (FIG. 4) defines a point on the planar surface 450 as part of either the first image frame 102 or the second image frame 104. The first light source (first LED) 410 and the second light source (second LED) 420 are located adjacent to the first and second light transmitting media 440, 442, respectively, such that when the first LED 410 is illuminated the first image frame 102 is illuminated and when the second LED 420 is illuminated the second image frame 104 is illuminated.

The driving device 402 is coupled to the first LED 410, the second LED 420 and the speaker 430 such that the driving device 402 causes the speaker to output a first sound when the first image frame 102 is illuminated and a second sound when the second image frame 104 is illuminated.

It will be appreciated that many variations of the apparatus 400 for synchronizing sound with an illuminated animated image will occur to one skilled in the art. For example, the illuminated animated image displayed by the apparatus may also comprise sub-frames. In the case of the first frame 102, the image of the laughing face may comprise two sub-frames, as shown in FIG. 1A. The overall image frame showing a laughing face remains illuminated, while alternately illuminating and extinguishing the two sets of upraised eyebrows 110A, 110B.

Specifically, the first sub-frame illuminates the upper upraised eyebrows, eyeballs 130, centered pupils 140, upper lip 160 and lower lip 170 while the second sub-frame illuminates the lower upraised eyebrows 110B, eyeballs 130, centered pupils 140, upper lip 160 and lower lip 170. In the case of the second frame 104, the image of the sad face, multiple sub-frames are possible, as shown in FIG. 1B. For example, the slanted eyebrows 120, eyeballs 130, downcast pupils 150 and upper lip 160 could be remain illuminated while the tears 180 are illuminated and extinguished in an alternating, repeating sequence such as upper tear 180A, middle tear 180B lower tear 180C. The sub-frames presented are intended as examples only as variations will occur to one skilled in the art. It will further be appreciated that the accompanying sounds may be chosen to reflect the image sub-frames as well as the entire image frames. For example, changes in pitch of the sound of laughter might correspond to alternating illumination of the upper upraised eyebrows 110A and the lower upraised eyebrows 110B.

The planar surface 450 may be any substantially planar surface through which the light transmitting media may be made to pass and to which the light transmitting media (e.g. 440 or 442 in FIG. 4) may be secured. For example, where the light transmitting media comprise optical fibers, the planar surface 450 may comprise plastic, paper, metal, wood or fabric with optical fibers extending through the planar surface 450 such that one end of each optical fiber defines a point on one side of the planar surface 450.

In such a configuration, the optical fibers may be secured to the backside 452 of the planar surface 450 using any suitable means known in the art. For example, standard white Elmer's Cement, wood glue, alcohol based glue, UltraViolet based Fixatives, and epoxies can all be suitable means to secure the optical fibers to the planar surface. The planar surface 450 may further comprise various domestic, commercial, personal or household items. For example, the planar surface may comprise doors, countertops, tabletops, walls, commercial displays, signs, floors, clothing, pillows, curtains, blankets and tablecloths, toys, packaging, greeting cards, books, lamps, rugs or mirrors.

In another embodiment, the planar surface 450 may be covered by a protective layer (not shown). The protective layer must be translucent or transparent so that the animated image can be seen through the protective layer. The protective layer may be rigid or flexible and may be made from any suitable material such as plastic or fabric. The protective layer may cover the planar surface 450 in such a manner that the end points of the light transmitting media 410, 420 cannot be felt by a person touching the planar surface 450. The protective layer may cover the planar surface 450 in such a manner that the end points of the light transmitting media 410, 420 are not directly visible but the illuminated animated image can still be seen. For example, the protective layer may comprise a substance that allows light to pass through from one direction, such as the side touching the planar surface 450, but that does not allow light to pass through from the other direction, such as the side a viewer would be watching.

In one embodiment, the protective layer comprises one way reflective plastic such that the light from the illuminated points passes through the protective layer to the viewer but light from the environment is reflected off the outer surface of the protective layer. Thus, in one embodiment the viewer sees only the illuminated animated image on a mirrored planar surface 450.

In alternative embodiments the driving device 402 may be configured to drive other, more complex combinations of image frames and synchronized sounds. For example, the use of a greater number of LEDs allows individual image elements to be switched on and off, perhaps to animate image sub-frames, rather than the entire image frame, perhaps to provide a larger number of image frames or perhaps to provide more elaborate image frames or sub-frames. For example, alternating illumination of the upper and lower upraised eyebrows 110A, 110B from FIG. 1A might comprise a sub-frame animation. A greater number of LEDs also allows the use of a greater variety of colours, for example, a red LED for an illuminated animated image of lips and a blue LED for an illuminated animated image of eyes.

A greater variety of synchronized sounds are also possible, as is a greater variety of interplay between the illuminated animated images and the synchronized sounds, even within a single image frame. For example, the image frame of the laughing face could be illuminated with a single set of upraised eyebrows while the sound of a voice telling a joke plays whereupon, when the joke is finished, the sound of laughter plays during the sub-frame animation of the alternating upper and lower upraised eyebrows. Multiple LEDs corresponding to multiple image elements, for example the image elements of FIG. 2, along with synchronized sounds of a voice speaking could be combined to make the illuminated animated image appear to be speaking.

In one embodiment, the driving device 402 comprises a memory module 330 from which the driving device retrieves programmed illumination sequences and synchronized sound.

In a further embodiment, the driving device 402 comprises a programmable memory module 330 and a communication module 310 having an interface for obtaining additional or substitute program sequences and sounds or for communicating information to other apparatuses or a communications network. By way of example, the interface may comprise a wired network interface, a wireless network interface, a digital media reader. In an additional embodiment, the communications module is capable of sending and/or receiving instructions through its interface regarding which sequences of illuminated animated images and accompanying synchronized sounds to execute.

Figure 5:
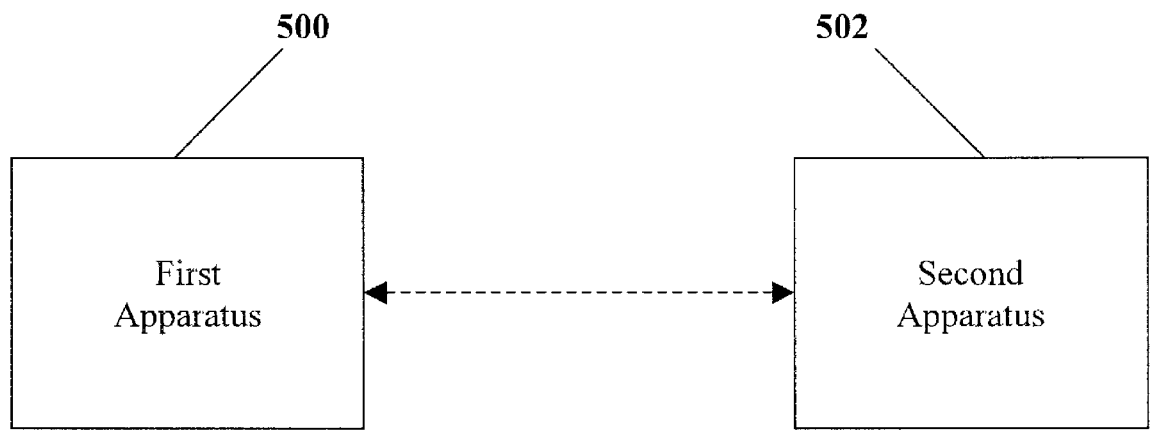
FIG. 5 is a block diagram of an embodiment of an interactive system for synchronizing sound with illuminated animated images.

FIG. 5 shows a schematic representation of an embodiment of an interactive system for synchronizing sound with and illuminated animated images. Shown are a first apparatus 500, for synchronizing sound with an illuminated animated image, and second apparatus, 502 for synchronizing sound with an illuminated animated image, located in proximity to one another. The communication modules 310 of the first apparatus 500 and the second apparatus 502 comprise interface devices for communicating information to other apparatuses.

The first apparatus 500 is in communication with the second apparatus 502 and the second apparatus 502 is in communication with the first apparatus 500. The first apparatus 500 and the second apparatus 502 are thus able to communicate information regarding sequences of illuminated animated image display and synchronized sounds and therefore are able to coordinate the display of illuminated animated images and synchronized sounds between them For example, using a proper combination of illuminated animated image displays and synchronized sounds it might appear as though the first apparatus 500 and the second apparatus 502 are conversing. Through reprogramming sequences and sounds a viewer could change the nature of the conversation to encompass any desired topic.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A method of synchronizing sound with an illuminated animated image, said method comprising:
   (a) defining a first image frame and a second image frame on a planar surface using a plurality of light transmitting media;
   (b) positioning a plurality of light sources adjacent the plurality of light transmitting media;
   (c) independently illuminating the first image frame and the second image frame by selectively activating each light source of the plurality of light sources in accordance with a pre-programmed illumination sequence; and
   (d) outputting a first sound when the first image frame is illuminated and outputting a second sound when the second image frame is illuminated.

2. The method of claim 1, wherein the plurality of light transmitting media comprise a plurality of optical fibers.

3. The method of claim 2, wherein each optical fiber has an end point and a base, and defines a first image frame and a second image frame and where the method further comprises securing a portion of the end points of the plurality of optical fibers to and through the planar surface.

4. The method of claim 3, wherein the plurality of optical fibers are arranged into a plurality of bundles, each bundle having a base end corresponding to the bases of the optical fibers therein, wherein positioning further comprises positioning a light source of the plurality of light sources adjacent to the base end of each bundle of the plurality of bundles.

5. The method of claim 1, further comprising accessing a memory located in the driving device to obtain the pre-programmed illumination sequence, the first audio track and the second audio track.

6. The method of claim 1, wherein the first image frame comprises a plurality of first image sub-frames and where illuminating the first image frame further comprises sequentially illuminating the plurality of first image sub-frames in accordance with the pre-programmed illumination sequence to produce an animated first image frame.

7. The method of claim 1, wherein the second image frame comprises a plurality of second image sub-frames and where illuminating the second image frame further comprises sequentially illuminating the plurality of second image sub-frames in accordance with the pre-programmed illumination sequence to produce an animated second image frame.

8. The method of claim 1, wherein the planar surface is covered with a protective layer, the protective layer allowing at least a portion of the light from the illuminated image frames to pass through the protective layer.

9. The method of claim 8, wherein the protective layer comprises plastic, fabric, light transmitting vinyl, light transmitting PVC or paper.

10. An apparatus for synchronizing sound with an illuminated animated image, said apparatus comprising:
    (a) a planar surface;
    (b) a plurality of light transmitting media coupled to the planar surface for defining a first image frame and a second image frame on the planar surface;
    (c) a plurality of light sources positioned adjacent to the plurality of light transmitting media; and
    (d) a driving device coupled to the light sources configured to:
        (I) independently illuminate the first image frame and the second image frame by selectively activating each light source of the plurality of light sources in accordance with a pre-programmed illumination sequence; and
        (II) output a first sound when the first image frame is illuminated and output a second sound when the second image frame is illuminated using a speaker mechanism coupled to the driving device.

11. The apparatus of claim 10, wherein the plurality of light transmitting media comprise a plurality of optical fibers.

12. The apparatus of 11, wherein each optical fiber has an end point and a base, and where defining a first image frame and a second image frame further comprises securing a portion of the end points of the plurality of optical fibers to and through the planar surface.

13. The apparatus of claim 12, wherein the plurality of optical fibers are arranged into a plurality of bundles, each bundle having a base end corresponding to the bases of the optical fibers therein, and adjacent to the base end of each bundle is a light source.

14. The apparatus of claim 10, wherein the first image frame is comprised of a plurality of first image sub-frames and the driving device is further configured to illuminate the first image frame by sequentially illuminating the plurality of first image sub-frames in accordance with the pre-programmed illumination sequence to produce an animated first image frame.

15. The apparatus of claim 10, wherein the second image frame is comprised of a plurality of second image sub-frames and the driving device is further configured to illuminate the second image frame by sequentially illuminating the plurality of first image sub-frames in accordance with the pre-programmed illumination sequence to produce an animated second image frame.

16. The apparatus of claim 10, wherein the driving device comprises a memory and where the driving device is further configured to access the memory to obtain the pre-programmed illumination sequence, first audio track and second audio track.

17. The apparatus of claim 10, wherein the planar surface is made of fabric.

18. The apparatus of claim 17, wherein the fabric comprises a home décor item selected from the non-exhaustive list of: pillow, blanket, table cloth, curtain.

19. The apparatus of claim 10, wherein the planar surface is made of plastic, paper, wood, metal, fabric, light transmitting vinyl or light transmitting PVC.

20. The apparatus of claim 10, wherein the planar surface is covered with a protective layer, the protective layer allowing at least a portion of the light from the illuminated image frames to pass through the protective layer.

21. The apparatus of claim 20, wherein the protective layer comprises plastic, fabric, light transmitting vinyl, light transmitting PVC or paper.

22. The apparatus of claim 10, further comprising a communication module for sending and receiving data over a communication network, wherein the driving device is further configured:

(i) to receive data via the communication module and illuminate the first image frame and the second image frame using the received data; and (ii) to provide data to the communication module for transmission.

23. An interactive system for synchronizing sound with an illuminated animated image comprising:

(A) a first apparatus and a second apparatus according to claim 22; and (B) the communication module of the first apparatus being further configured to send and receive data to and from the communication module of the second apparatus; and (C) the communication module of the second apparatus being further configured to send and receive data to and from the communication module of the first apparatus.

* * * * *